(12) United States Patent
Ahmad-Taylor (10) Patent No.: US 8,276,176 B2
(45) Date of Patent: Sep. 25, 2012

(54) METHOD AND SYSTEM FOR PROVIDING AN ELECTRONIC PROGRAMMING GUIDE

(75) Inventor: Ty O. Ahmad-Taylor, New York, NY (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 2464 days.

(21) Appl. No.: 10/825,926

(22) Filed: Apr. 15, 2004

(65) Prior Publication Data

US 2005/0235321 A1 Oct. 20, 2005

(51) Int. Cl.
*H04N 5/445* (2011.01)
*G06F 3/00* (2006.01)
*G06F 13/00* (2006.01)

(52) U.S. Cl. .............. 725/52; 725/39; 725/40; 725/43

(58) Field of Classification Search ............ 725/39, 725/52

See application file for complete search history.

(56) References Cited

U.S. PATENT DOCUMENTS

| | | | |
|---|---|---|---|
| 5,907,323 A | 5/1999 | Lawler et al. | |
| 6,005,601 A | 12/1999 | Ohkura et al. | |
| 6,177,931 B1 * | 1/2001 | Alexander et al. | 725/52 |
| 6,317,883 B2 | 11/2001 | Marics | |
| 6,331,877 B1 * | 12/2001 | Bennington et al. | 348/731 |
| 6,857,128 B1 * | 2/2005 | Borden et al. | 725/39 |
| 6,944,880 B1 * | 9/2005 | Allen | 725/106 |
| 8,001,563 B2 * | 8/2011 | Knudson et al. | 725/38 |
| 2003/0106057 A1 * | 6/2003 | Perdon | 725/45 |
| 2005/0015804 A1 * | 1/2005 | LaJoie et al. | 725/44 |
| 2005/0028206 A1 * | 2/2005 | Cameron et al. | 725/46 |
| 2009/0150922 A1 * | 6/2009 | Russ et al. | 725/30 |
| 2009/0193458 A1 * | 7/2009 | Finseth et al. | 725/34 |
| 2010/0115556 A1 * | 5/2010 | Yuen et al. | 725/41 |
| 2010/0251303 A1 * | 9/2010 | Ellis et al. | 725/43 |
| 2010/0287591 A1 * | 11/2010 | Knudson et al. | 725/58 |

OTHER PUBLICATIONS

International Search Report for corresponding International Application No. PCT/US05/08219, mailed Mar. 15, 2007, 2 pages.

* cited by examiner

*Primary Examiner* — Nasser Goodarzi
*Assistant Examiner* — Fred Peng
(74) *Attorney, Agent, or Firm* — Banner & Witcoff Ltd.

(57) ABSTRACT

A method and system for electronically providing a television listing guide. The listing guide includes a number of channels intersecting with a number of time-slots to display an array of cells which can be selected to view a program corresponding with the cell. The guide allows a viewer to easily associate a selected cell with its program information.

44 Claims, 6 Drawing Sheets

METHOD AND SYSTEM FOR PROVIDING AN ELECTRONIC PROGRAMMING GUIDE

BACKGROUND OF THE INVENTION

1. Field of the Invention

The present invention relates to electronic programming guides (EPGs).

2. Background Art

It is known in the art to electronically display a television listings guide. Such guides have been used by cable, satellite, and other television service providers. The guides are commonly referred to as electronic program guides (EPGs).

An EPG can include an array of channels and time-slots. A cell at the intersection of each channel and time-slot provides a program title. The program title corresponds to a program that can be viewed for the indicated channel at the indicated time. The cell can be selected with a cursor or other indicating means to change the channel thereto.

Subscribers may desire additional program information relating to the programs, such as the name of the actors, a short summary of the plot, a running length, or other information. It is desirable that the subscriber be able to easily associate the program information with the selected cell.

The known EPGs prevent the subscriber from easily associating the program information with the selected cell. Known EPGs separate the program information from the selected cell by displaying it remotely therefrom, such as in another remote portion of the screen or in a separate screen. The separation creates a gap between the program information and the selected cell. The separation gap induces a disconnect or disassociation between the selected cell and the cell information, preventing the subscriber from easily associating the program information with the selected cell.

Accordingly, there exists a need for a television listings guide that easily associates the selected cell with its program information.

SUMMARY OF THE INVENTION

It is, therefore, an object of the present invention to display an electronic programming guide (EPG) in a manner that easily associates a selected cell with its program information.

The present invention contemplates a number of features for providing the listings guide, including a transceiver that receives signals from a provider and outputs signals to a display. The transceiver can be a stand alone item or integrated with the display. Preferably, it is configured for a cable or satellite television provider to present the EPG.

The EPG preferably displays an array of channels and time-slots. A cell at the intersection of each channel and time-slot provides a program title. Each program title corresponds with a channel and time-slot to indicate a program showing for the channel at the indicated time. Each cell can be separately selected for displaying additional program information related thereto.

In accordance with the present invention, the EPG can include a window. The window can be fixed at an upper, lower, middle, or other position of the array. Preferably, the window covers a single cell in an upper-left portion of the array. The window can display the program title, a channel number, and/or the program information related to the selected cell.

Preferably, at least the program title in the window is magnified so it appears larger than the program titles in the non-selected cells. The subscriber can easily differentiate the selected (magnified) cell from the other displayed cells to facilitate its association with the displayed program information.

Preferably, the program information is displayed in the window proximate, or close to, the program title. The program information can be sufficiently close to, or even adjoining, the selected cell to eliminate any disconnect or disassociation between the selected cell and the program information. The subscriber can easily associate the selected cell with its program information.

Different programs can be scrolled into the window with actuation of navigation buttons included in the EPG or a remote control. The content of the non-selected cells is scrolled into the window without any re-loading or refreshing, in a seamless manner, to enhance the stylistic integrity of the listings guide and to provide the appearance of continuous navigation.

In accordance with the present invention, the window can include an auxiliary menu. The menu can include auxiliary buttons for use in performing auxiliary functions relating to the selected cell. These auxiliary functions can include a back function to close the auxiliary window, a record button to record the program in the selected cell, an on-demand button to view the program in the selected cell on-demand, a record all programs button to record all programs showing on the selected cell, a go to program button to display the program in the selected cell for full-screen viewing, a reminder button to set a reminder in the event that the program in the selected cell is a non-current time-slot, a more information button to display additional program information for the program in the selected cell, and a lock button to prevent viewing of the program in the selected cell without a password.

DETAILED DESCRIPTION OF THE PREFERRED EMBODIMENT(S)

Figure 1:
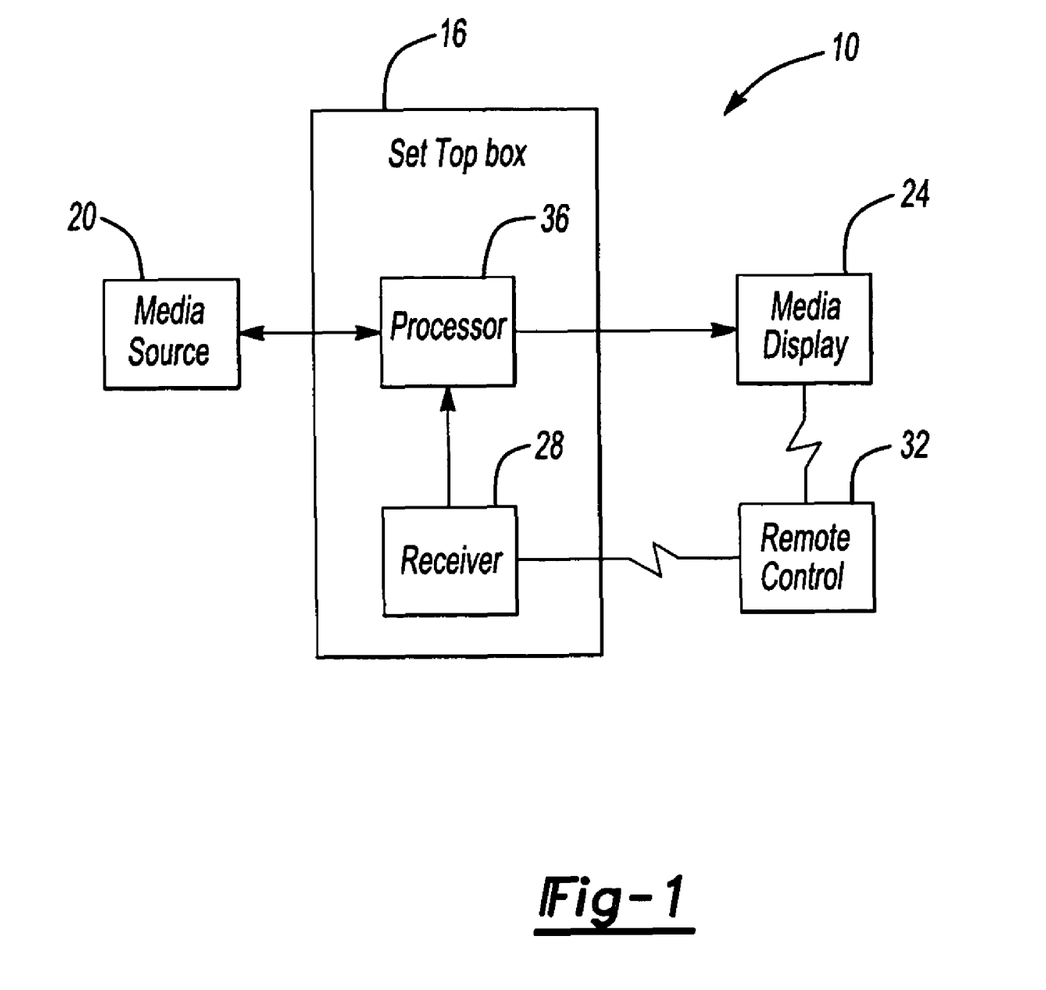
FIG. 1 illustrates a system for displaying an EPG in accordance with the present invention.

FIG. 1 illustrates system 10 for displaying an electronic programming guide (EPG) in accordance with the present invention. System 10 includes a transceiver settop box (STB) 16 to receive signals from media source 20 and to provide signals to media display 24. STB 16 can receive program signals from a cable provider and transmit program signals to a television or other media display, such as a PC, to display the program signals.

Media source 20 can be a cable television network that transmits and receives program signals to and from a programming source, such as an uplink, to at least one head-end server (not shown). The head-end server can communicate the signals with STB 16. The program signals can include video signals, audio signals, and program information for all episodes and series available on a cable television network.

Transmission may occur via satellite or through cables, however, the present invention is not dependent upon the particular means of transmission or reception. The head-end server can include a program database that stores the program information.

STB 16 receives the program signals from media source 20 and controls which programs are displayed on associated display 24. As an alternative to the separate housing of STB 16, system components could be included in another signal reception or processing device, such as a satellite receiver, a television receiver, or a VCR. STB 16 could be eliminated and its functionality integrated with a television, a satellite receiver, or other media displaying device.

To facilitate the control of STB 16, receiver 28 can be provided for receiving remote control signals from remote control 32. Remote control 32 functions in a conventional manner, transmitting signals via infrared, radio frequency, or other signaling technology. Processor 36 can be provided to interpret and act upon the signals received from media source 20 and receiver 28, and then in turn provide the signals to media display 24 in accordance with the present invention.

As one skilled in the art will appreciate, system 10 is merely one exemplary configuration for displaying the EPG, and other configurations, including more or less components, could similarly be used without deviating from the scope and contemplation of the present invention.

The present invention is not limited to cable providers and the services which they provide. It is within the scope and contemplation of the present invention that the present invention be used with satellite systems and similar systems which provide on-demand services, including services which may operate through the Internet/world wide web.

Figure 2:
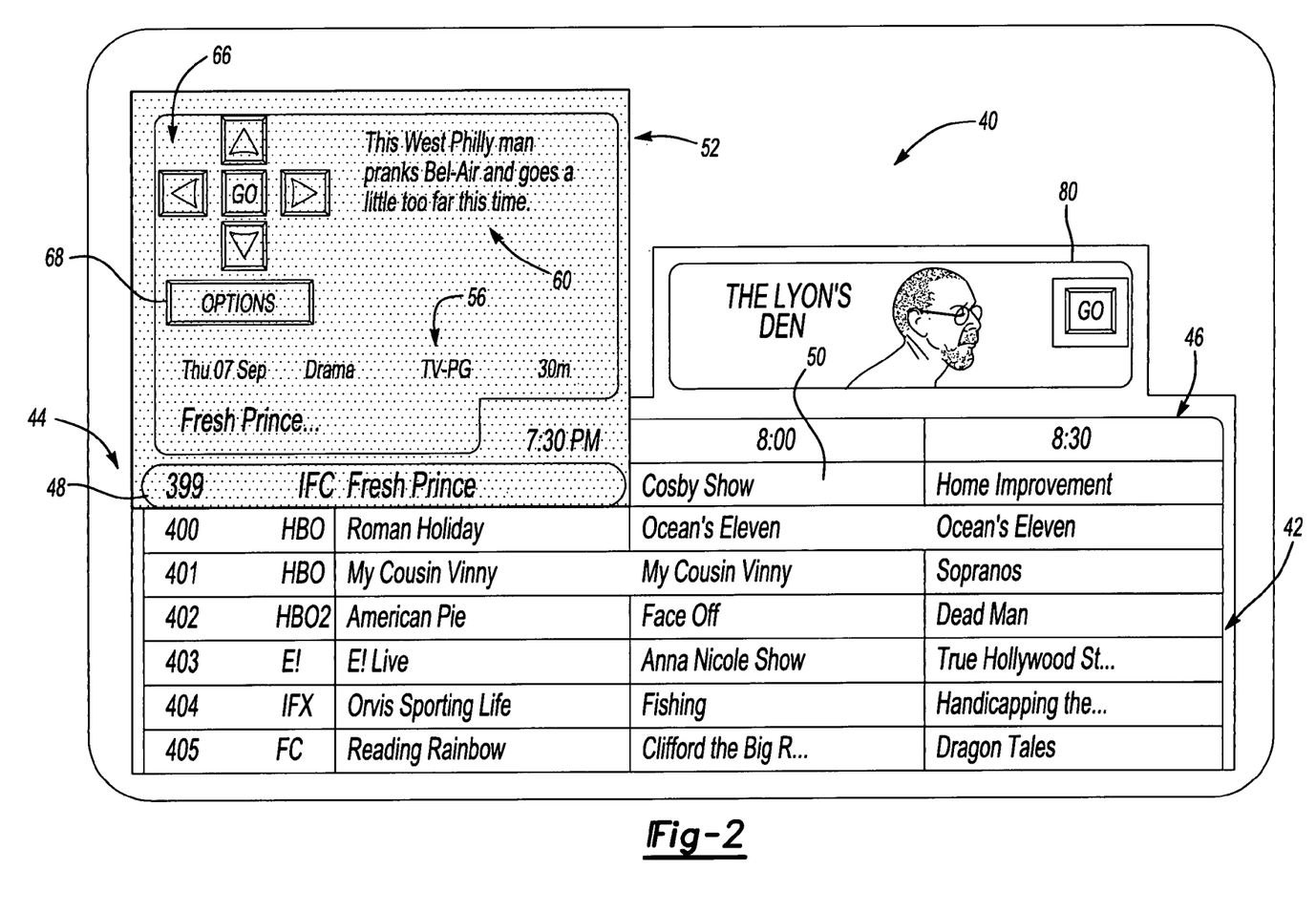
FIG. 2 illustrates a first embodiment of an EPG in accordance with the present invention.

FIG. 2 illustrates EPG 40 in accordance with the present invention. EPG 40 includes an array 42 defined by a number of channels 44 and time-slots 46 which intersect at cells (only cell 48 and 50 are labeled for simplicity) to display program titles of programs which may be viewed on the indicated channel at the indicated time. Cell 48 corresponds with Fresh Prince showing on channel 399 at 7:30 p.m. Cell 50 corresponds with Cosby Show showing on channel 399 at 8:00 p.m.

Window 52 is preferably in an upper-left position of array for selecting cell 48. However, window 52 can be fixed at an upper, lower, middle, or any other position of the array. Preferably, window 52 covers a single cell. Window 52 includes first portion 56 for highlighting a channel number, a channel title and a program title. The channel number and the program title preferably appear larger than the other non-selected cells to further assist the subscriber in discriminating between selected cell 48 and non-selected cell 50.

Window 52 further includes second portion 60 which includes program information relating to selected cell 48. This information can be helpful to the subscriber in understanding what the program relates to. It can include, but is not limited to, a brief description of the program, a genre type, a rating, a run time, and a date and time on which the program is showing.

First portion 56 and second portion 60 are closely positioned to each other to facilitate the association of the program information with selected cell 48. This assists the subscriber in associating selected cell 48 with its program information 60.

Arrow control grid 66 is provided for changing the cell and time-slot selected in window 52. A corresponding navigation tool on remote control 32 can include similar arrows and an ENTER button such that the arrows can be used to navigation an UP button, a DOWN button, a LEFT button, a RIGHT button, and a GO button of arrow grid 66. The remote control buttons (not shown) can be used to highlight the different arrows of arrow grid 66. The remote control enter button can be used to actuate one of the buttons in arrow grid 66 to perform the corresponding function.

UP and DOWN buttons can be selected and actuated in this manner to change the selected cell up and down. Optionally, remote control 32 can further include number buttons for punching in a desired channel number such that the punched in channel automatically appears in window 52 without requiring the subscriber to actuate the up and down arrows. This can quickly change the selected cell to another channel 44.

Similar to UP and DOWN buttons, LEFT and RIGHT buttons can be selected and actuated to move the selected cell and the time-slot 46 displayed in window 52. As shown, the time-slot default is 7:30 p.m. because it is the time period which corresponds to the actual time at which guide 40 was called up. To advance forward and backward in time, the LEFT and RIGHT buttons are actuated.

The actuation of UP, DOWN, LEFT, and RIGHT buttons causes the content in window 52 to change in the direction indicated by the actuated arrow. Window 52 preferably remains in a fixed position. The content from another cell is scrolled into window 52 with such movement. This scrolling is preferably done without any re-loading or refreshing, in a seamless manner, to enhance the stylistic integrity of the listings guide and to provide the appearance of continuous navigation.

Figure 3:
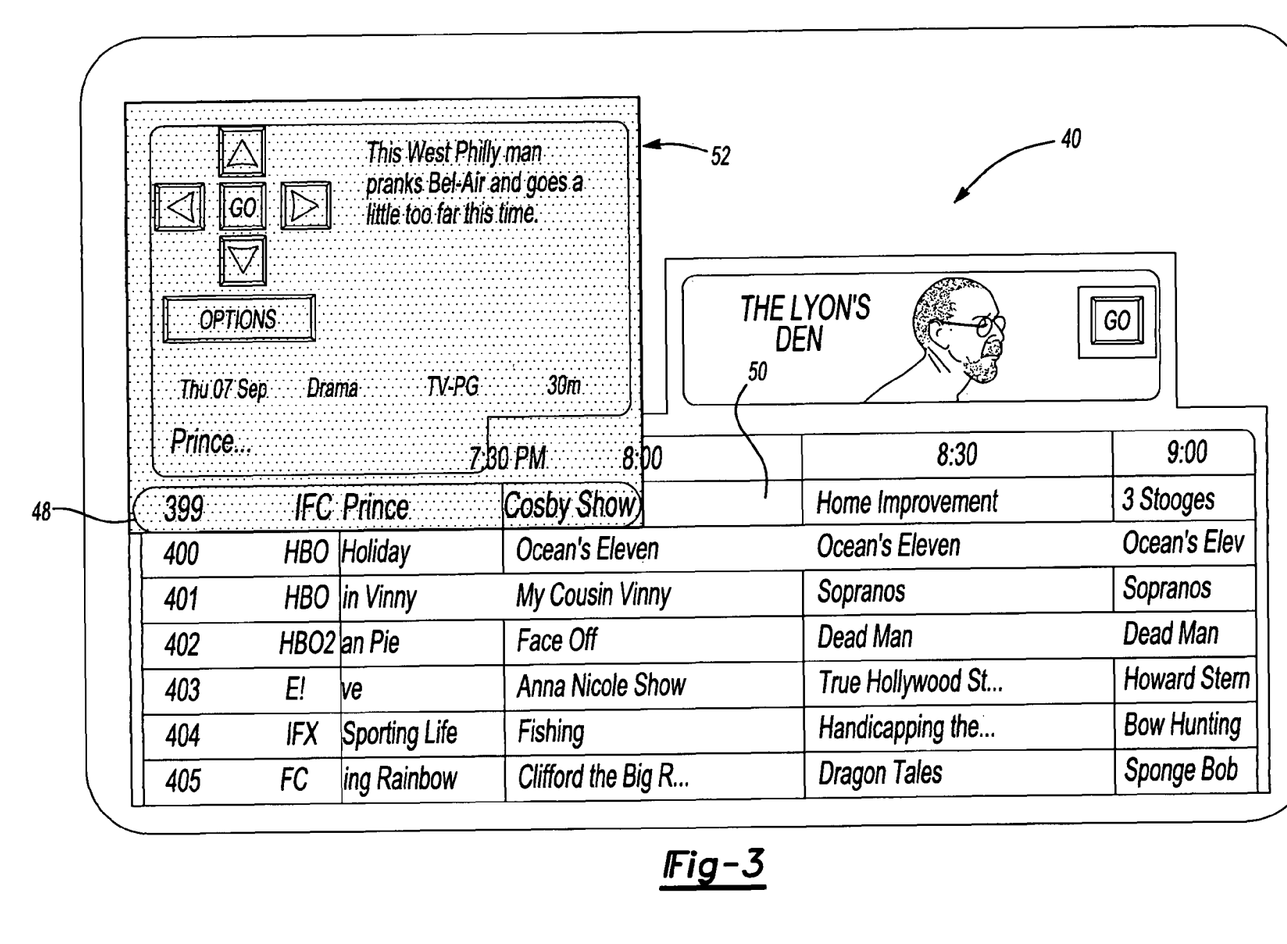
FIG. 3 illustrates a scrolling of content into the EPG of FIG. 2 in accordance with the present invention.

FIG. 3 illustrates this scrolling action. Actuation of the LEFT arrow causes the contents from cell 50 to enter window 52 while the content of cell 48 is exiting window 52. The content appears to move across EPG 40 in animation such that the content from one cell appears briefly in window 52 with the previous content in window 52. Similar movements can be made with the UP and DOWN buttons to change channel 44.

By scrolling the content into window 52, instead of moving window 52 to the content, the subscriber is able to easily determine the selected cell. The subscriber always knows where window 52 is and will not have to chase its movements around EPG 40. Window 52 could also be fixed in other positions of guide and the content could be scrolled thereto in a similar manner.

Once the desired cell is selected in window 52, it can be tuned to by actuating the Go button. EPG 40 is then removed from the screen and the selected program is shown in full-screen on the media display 24. To change cells using EPG 40, the subscriber presses a corresponding button on remote control 32, which then communicates with receiver 28 to prompt processor 36 to EPG 40.

Figure 4:
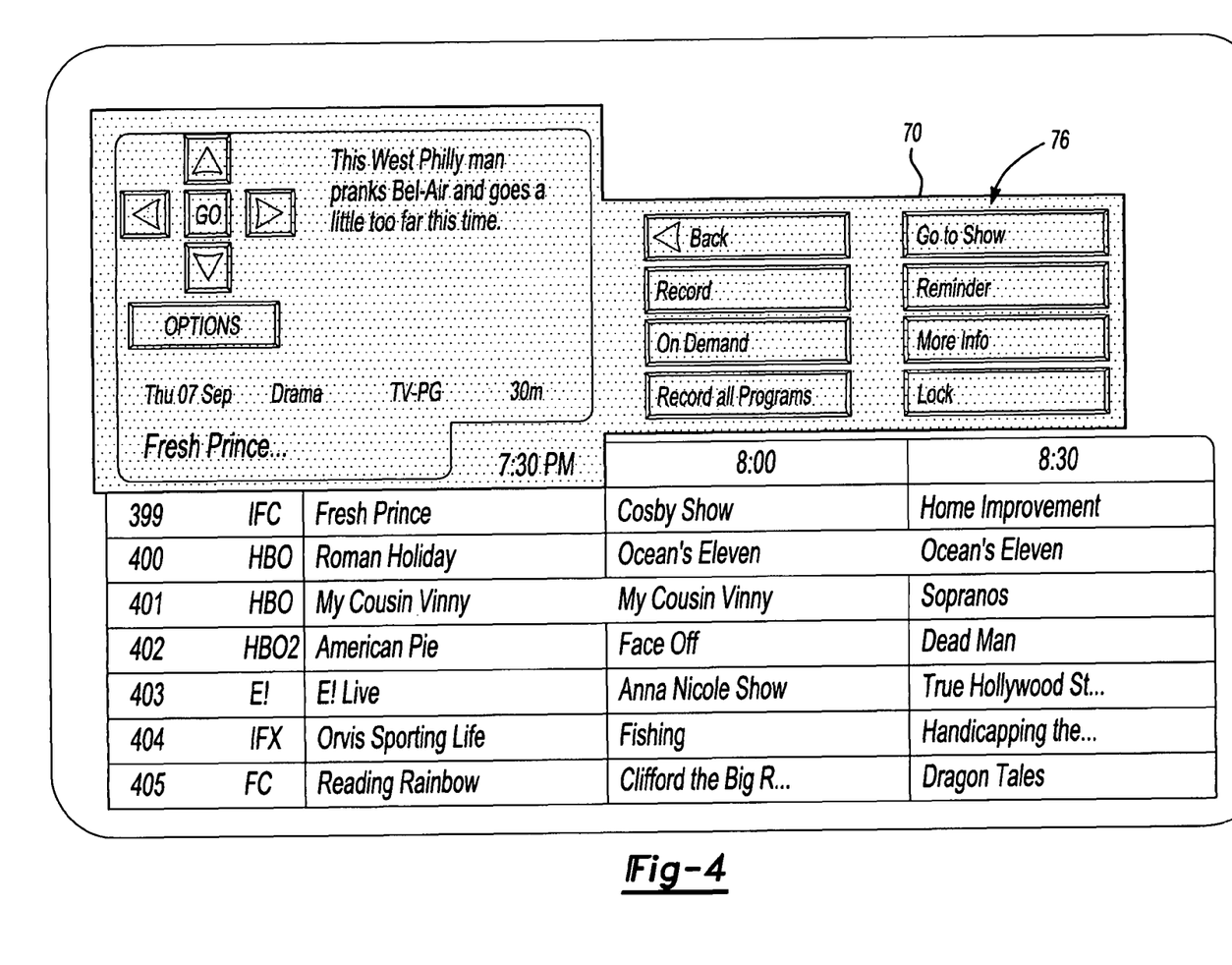
FIG. 4 illustrates an auxiliary menu for the EPG of FIG. 2 in accordance with the present invention.

In addition to tuning to the desired program, window 52 can provide additional functionality by actuating OPTIONS button 68. As shown in FIG. 4, auxiliary menu 70 appears with auxiliary buttons 76 in response to actuation of the options button. Preferably, auxiliary window 70 extends from window 52 as a pop-out window without changing or re-loading the screen.

Auxiliary menu 70 includes a BACK button, a RECORD button, an ON-DEMAND button, a GO TO SHOW button, a REMINDER button, a MORE INFO button, and a LOCK button. Each button can be selected and actuated by control of the navigation buttons on remote control 32.

The BACK button takes the subscriber back to window 52 shown in FIG. 2. The RECORD button allows the selected program to be stored on a personal video recorder or other recording medium. Advantageously, this feature allows the user to select programs showing at a later time or date for automatic recording. Similarly, the RECORD ALL PROGRAMS button causes the recording medium to record all the episodes for the selected cell. This can comprises a weekly recording where all programs playing a the selected time and date are recorded or it can be an intelligent process where processor 36 searches for all the programs having a title corresponding with the selected program such that each of the corresponding programs is recorded when it airs.

The ON-DEMAND button allows the subscriber to order the program on-demand if it is available. The GO TO SHOW button allows the channel to be tuned to without navigating back to the GO button. The REMINDER button allows the subscriber to set an alarm or other notification means such that the television turns on or other programming is interrupted to issue a reminder that the selected program is playing. The MORE INFO button provides additional informational information regarding the selected program. Preferably, this information is a supplement to the program information already being shown in window 52. The LOCK button prevents viewing of the program without entering a password. In this manner, subscribers without the password cannot view the program.

As shown in FIG. 2, advertising window 80 is an optional feature which allows media source 20 to program advertisements. The displayed image can be static or animated. Media source 20 can control the advertised subject matter, and can relate it to selected cell 48. In addition, advertising window 80 can be selectable such that the subscriber can select window 80. By selecting window 80, the subscriber is taken to a program corresponding with the advertisements, which could be a different program, an on-demand program, or other screen/window.

Figure 5:
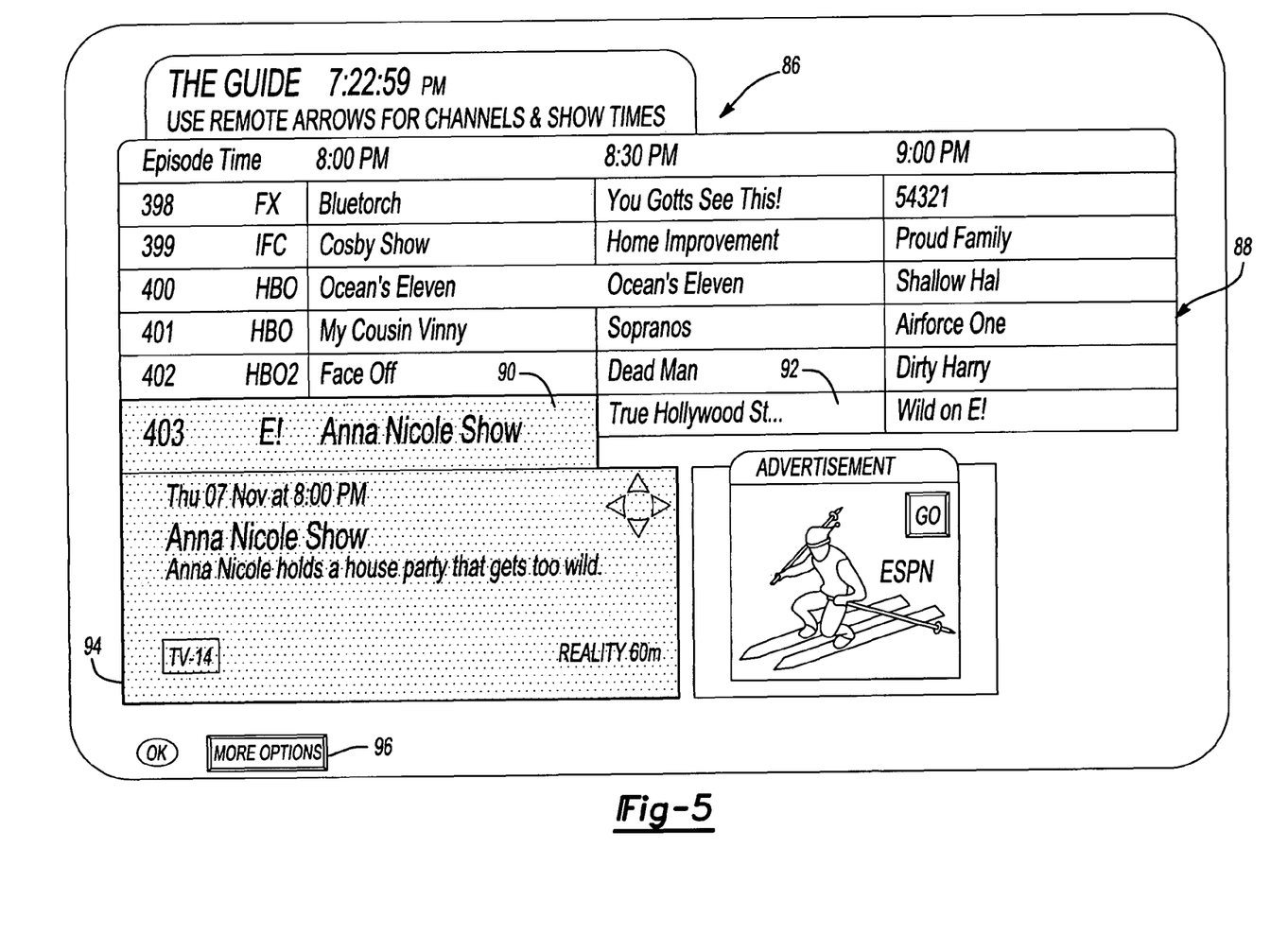
FIG. 5 illustrates a second embodiment of an EPG in accordance with the present invention.

FIG. 5 illustrates another embodiment of EPG 86 in accordance with the present invention. EPG 86 is arrowless and operates in the same manner as EPG 44, except that EPG 86 does not include the navigation arrow buttons shown in EPG 44. Rather, features, such as arrows and other buttons, are included on remote control 32. These remote control features allow the subscriber to scroll through array 88. For example, cells 90 and 92 can be scrolled into window 94.

Remote control 32 can further include an enter button or similar button to select the channel shown in window 94. Left and right arrows on remote control 32 can be used to change the time-slot, and up and down arrows can be used to change the channel. Once the desired cell is displayed, the enter button can be actuated to select and tune the desired channel.

Figure 6:
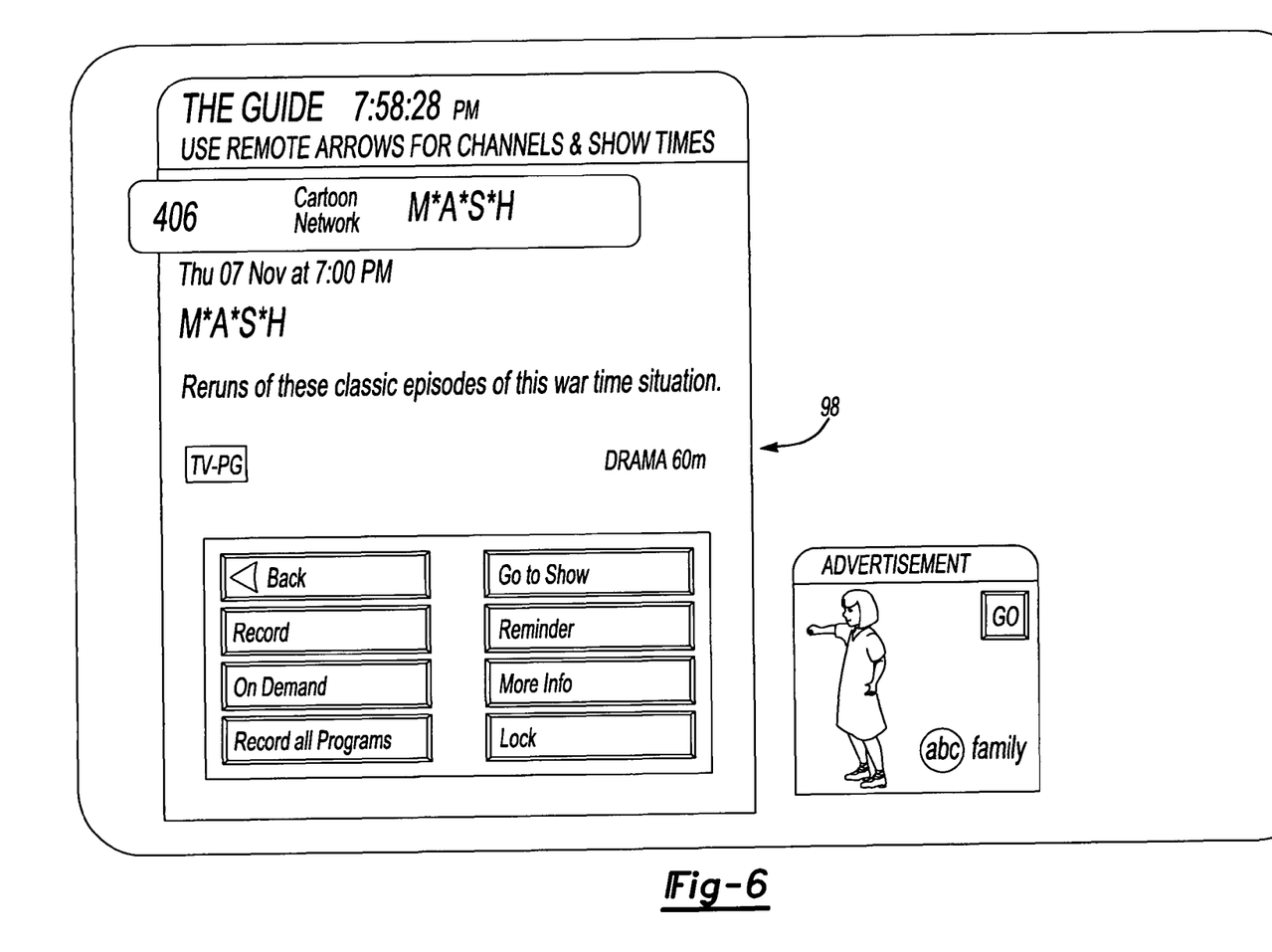
FIG. 6 illustrates an auxiliary menu for the EPG of FIG. 5 in accordance with the present invention.

MORE OPTIONS button 96 can be actuated to display auxiliary menu 98, as shown in FIG. 6. Auxiliary menu 98 appears on a new screen and guide 86 is removed. This is done to provide more area for menu 98 so that additional text information can be shown. A BACK button, a RECORD button, an ON-DEMAND button, a GO TO SHOW button, a REMINDER button, a MORE INFO button, and a LOCK button are displayed in menu 98. Each button can be selected and actuated by control of the navigation buttons on remote control 32. The functions of these buttons is described above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus comprising:
   a processor configured to process program information and to cause display of an electronic program guide comprising:
   a celled grid having a first data set on a vertical axis and a second data set on a horizontal axis, wherein cells at an intersection of the first data set and the second data set display a title for an available program; and
   a window having a boundary line defining a perimeter of the window, where a portion of the perimeter is located outside of the grid and another portion of the perimeter extends to include a subset of the cells of the grid within the window, the subset comprising a highlighted cell, an associated element of the first data set, and an associated element of the second data set, wherein the window and the celled grid overlap such that the window displays a description of a program associated with the highlighted cell outside of the overlap, and wherein the processor is further configured to:
   process an instruction indicating a change in which cell to highlight; and
   cause presentation of an update to the electronic program guide including a newly highlighted cell within the window in response to processing of the instruction.

2. The apparatus of claim 1 wherein the highlighted cell is magnified within the window.

3. The apparatus of claim 1 wherein a position of the window is fixed and a program title of a next cell is scrolled into the window.

4. The apparatus of claim 3 wherein the scrolling is in response to selection of a navigation button in the electronic program guide.

5. The apparatus of claim 3 wherein the scrolling is in response to actuation of a navigation button.

6. The apparatus of claim 1 wherein an auxiliary menu is displayed in the window, the auxiliary menu including a menu of options for the highlighted cell.

7. The apparatus of claim 6 wherein the auxiliary menu is displayed in response to actuation of an auxiliary menu button to cause the auxiliary menu to be displayed extending outward from the portion of the perimeter of the window located outside of the grid.

8. The apparatus of claim 7 wherein display of the auxiliary menu includes displaying the auxiliary menu at the same time as the program information.

9. The apparatus of claim 1 wherein the window is positioned at a fixed location within the electronic program guide, and wherein another title is scrolled to the fixed location of the window to display the program information associated therewith.

10. The apparatus of claim 9 wherein lettering associated with the title traverses across the portion of the perimeter of the window extending into the grid when the other title is scrolled to the fixed location of the window.

11. The apparatus of claim 10 wherein the lettering traverses in a step-wise manner across the perimeter of the window, the step-wise manner causing consecutive letters to appear on opposite sides of the portion of the perimeter of the window extending into the grid.

12. The apparatus of claim 1 wherein the window includes a re-display of the title in the highlighted cell at a location offset from the highlighted cell such that the title is displayed at two different locations within the perimeter of the window.

13. The apparatus of claim 1 wherein an area defined by the perimeter of the window is colored, the coloring of the window causing the window to standout relative to the rest of the electronic program guide.

14. The apparatus of claim 1 wherein the electronic program guide comprises an advertisement.

15. The apparatus of claim 14 wherein the advertisement is related to the highlighted cell.

16. A method of presenting an electronic program guide comprising:
 causing, by a processing device, display of a celled grid having a first data set on a vertical axis and a second data set on a horizontal axis, wherein cells at an intersection of the first and second data sets display a program title for an available program;
 upon receiving input highlighting one of the cells, causing generation of a window having a boundary line defining a perimeter of the window, a portion of the perimeter being located outside of the grid and another portion of the perimeter extending to include a subset of the cells from the grid within the window, the subset comprising the highlighted one of the cells, one of a first data set element, and one of a second data set element, wherein the window and the celled grid overlap such that the window displays a description of a program associated with the highlighted cell outside of the overlap;
 processing an instruction indicating a change in which cell to highlight; and
 causing presentation of an update to the electronic program guide including a newly highlighted cell within the window in response to processing of the instruction.

17. The method of claim 16 further comprising scrolling the grid cells such that lettering associated with another program title and a corresponding first data set element or a second data set element traverses across the portion of the perimeter of the window extending into the grid.

18. The method of claim 17 further comprising scrolling the lettering in a step-wise manner across the perimeter of the window, the step-wise manner causing consecutive letters to appear on opposite sides of the portion of the perimeter of the window extending into the grid.

19. The method of claim 18 further comprising fixing a location of the window within the electronic program guide such that the other cells are scrolled to the fixed location of the window.

20. The method of claim 16 further comprising displaying program information for the program title appearing in the highlighted cell within a portion of the window located outside of the grid.

21. The method of claim 20 further comprising re-displaying the program title in the highlighted cell at a location offset from the highlighted cell such that the program title is displayed at two different locations within the perimeter of the window.

22. The method of claim 16 further comprising coloring an area defined within the perimeter of the window with a color that causes the window to standout relative to the rest of the electronic program guide.

23. An apparatus comprising:
 a processor configured to process program information and to cause display of an electronic program guide comprising:
  a celled grid having a first data set on a vertical axis and a second data set on a horizontal axis, wherein cells at an intersection of the first data set and the second data set display an available program title; and
  a window displaying information concerning a program title of a highlighted cell, wherein the window is located such that there are no non-highlighted cells between the highlighted cell and the window, wherein the celled grid and the window overlap such that the highlighted cell of the celled grid is located within the window, wherein the window displays a description of a program associated with the highlighted cell outside of the overlap, and wherein the window and the highlighted cell have a consistent background that differs from a background of other cells in the celled grid, wherein the processor is further configured to:
 process an instruction indicating a change in which cell to highlight; and
 cause presentation of an update to the electronic program guide including a newly highlighted cell within the window in response to processing of the instruction.

24. The apparatus of claim 23, wherein the grid cells are scrollable vertically and horizontally, and wherein titles associated with the first data set move into an adjacent row in response to vertical scrolling and titles associated with the second data set move into an adjacent column in response to horizontal scrolling.

25. The apparatus of claim 23 wherein the window displays only one program title from the grid.

26. The apparatus of claim 23 wherein the window further includes an auxiliary menu, the auxiliary menu including a menu of options for the highlighted cell.

27. The apparatus of claim 26 wherein the auxiliary menu is displayed extending outward from a portion of a perimeter of the window located outside the grid.

28. The apparatus of claim 26 wherein selection of one of the auxiliary menu options causes the apparatus to close the auxiliary menu.

29. The apparatus of claim 26 wherein selection of one of the auxiliary menu options causes the apparatus to record the program in the highlighted cell.

30. The apparatus of claim 26 wherein selection of one of the auxiliary menu options causes the apparatus to order the program in the highlighted cell on-demand.

31. The apparatus of claim 26 wherein selection of one of the auxiliary menu options causes the apparatus to automatically record all occurrences of programs relating to the highlighted cell.

32. The apparatus of claim 31 wherein the occurrences of the selected program are recorded even if at a different time and channel than the highlighted cell.

33. The apparatus of claim 26 wherein selection of one of the auxiliary menu options causes the apparatus to tune to the program in the highlighted cell.

34. The apparatus of claim 26 wherein selection of one of the auxiliary menu options causes the apparatus to set a reminder notification for the program in the highlighted cell.

35. The apparatus of claim 26 wherein selection of one of the auxiliary menu options causes the apparatus to display more information regarding the program in the highlighted cell.

36. The apparatus of claim 26 wherein selection of one of the auxiliary menu options causes the apparatus to limit access to a program corresponding the highlighted cell.

37. The apparatus of claim 26 wherein the auxiliary menu is displayed at the same time as the program title.

38. The apparatus of claim 23 wherein the electronic program guide further includes an advertisement relating to the highlighted cell.

39. A method of presenting an electronic program guide comprising:
 causing, by a processing device, display of a celled grid having a first data set on a vertical axis and a second data set on a horizontal axis, wherein a cell at an intersection of the first data set and the second data set displays a title for an available program; and causing display of scrolling of the grid cells vertically or horizontally such that titles associated with the first data set move into an adjacent row when scrolling vertically and titles associated with the second data set move into an adjacent column when scrolling horizontally, wherein a first program title occupies a window displaying program information about a first program, and when a second program title is caused to scroll into the window, at least a portion of the first program title and the second program title share the window until the first program title exits the window, wherein the window and the celled grid overlap such that the window displays a description of a program associated with the highlighted cell outside of the overlap.

40. An apparatus comprising:

a processor configured to process program information and to cause display of an electronic program guide comprising:

a celled grid having a first data set on a vertical axis and a second data set on a horizontal axis, wherein grid cells at an intersection of the first data set and the second data set display an available program title; and the grid cells being capable of scrolling vertically and horizontally and wherein program titles associated with the first data set move into an adjacent row when the grid cells scroll vertically and program titles associated with the second data set move into an adjacent column when the grid cells scroll horizontally, wherein a first program title occupies a window displaying program information about a first program, and when a second program title is caused to scroll into the window, at least a portion of the first program title and the second program title share the window until the first program title exits the window, wherein the window and the celled grid overlap such that the window displays a description of a program associated with the highlighted cell outside of the overlap.

41. A method comprising:

causing, by a processing device, display of a celled grid having a first data set on a vertical axis and a second data set on a horizontal axis, wherein cells at an intersection of the first data set and the second data set display an available program title;

causing display of a window displaying information concerning a program title of a highlighted cell, wherein the window is located such that there are no non-highlighted cells between the highlighted cell and the window, wherein the celled grid and the window overlap such that the highlighted cell of the celled grid is located within the window, wherein the window and the celled grid overlap such that the window displays a description of a program associated with the highlighted cell outside of the overlap, and wherein the window and the highlighted cell have a consistent background that differs from a background of other cells in the celled grid;

processing an instruction indicating a change in which cell to highlight; and causing presentation of an update to an electronic program guide including a newly highlighted cell within the window in response to processing of the instruction.

42. The method of claim 41, wherein the window further includes an auxiliary menu, the auxiliary menu including a menu of options for the highlighted cell.

43. The method of claim 42, further comprising displaying the auxiliary menu extending outward from a portion of a perimeter of the window located outside the grid.

44. The method of claim 41, wherein the grid cells are scrollable vertically and horizontally, and wherein titles associated with the first data set move into an adjacent row in response to vertical scrolling and titles associated with the second data set move into an adjacent column in response to horizontal scrolling.

\* \* \* \* \*